(12) United States Patent
Kim

(10) Patent No.: US 8,938,056 B2
(45) Date of Patent: Jan. 20, 2015

(54) TERMINAL EQUIPMENT FOR PROVIDING AN ADDITIONAL CALL PROCESSING SERVICE, AND METHOD FOR OPERATING SAME

(71) Applicant: Yongjin Kim, Seoul (KR)

(72) Inventor: Yongjin Kim, Seoul (KR)

( * ) Notice: Subject to any disclaimer, the term of this patent is extended or adjusted under 35 U.S.C. 154(b) by 0 days.

(21) Appl. No.: 14/349,847

(22) PCT Filed: Sep. 26, 2012

(86) PCT No.: PCT/KR2012/007739
§ 371 (c)(1),
(2) Date: Apr. 4, 2014

(87) PCT Pub. No.: WO2013/051811
PCT Pub. Date: Apr. 11, 2013

(65) Prior Publication Data
US 2014/0254784 A1   Sep. 11, 2014

(30) Foreign Application Priority Data

Oct. 6, 2011   (KR) .................. 10-2011-0101798

(51) Int. Cl.
*H04M 3/42*   (2006.01)
*H04M 3/00*   (2006.01)
*H04M 5/00*   (2006.01)
*H04M 3/428*   (2006.01)

(52) U.S. Cl.
CPC ........ *H04M 3/42229* (2013.01); *H04M 3/4283* (2013.01)
USPC ............ 379/207.02; 379/201.01; 379/201.05; 379/265.11

(58) Field of Classification Search
USPC ............. 379/207.02, 201.01, 201.05, 265.05, 379/265.11; 709/206; 455/414.1
See application file for complete search history.

(56) References Cited

U.S. PATENT DOCUMENTS

| 8,761,737 B2 * | 6/2014 | Clarke et al. ............... 455/414.1 |
| 2012/0179767 A1 * | 7/2012 | Clarke et al. .................. 709/206 |

FOREIGN PATENT DOCUMENTS

| JP | 08-251133 A | 9/1996 |
| JP | 2002-142000 | 5/2002 |
| JP | 2002-523935 A | 7/2002 |
| JP | 2009-147841 | 7/2009 |
| JP | 2010-183205 | 8/2010 |
| JP | 2011-119966 | 6/2011 |
| JP | 2001-186240 | 7/2011 |
| KR | 10-2005-0122177 | 12/2005 |
| KR | 10-2005-0122177 A | 12/2005 |
| KR | 10-2006-0108988 | 10/2006 |
| KR | 10-2006-0108988 A | 10/2006 |
| KR | 10-2010-0061896 A | 6/2010 |

(Continued)

OTHER PUBLICATIONS

KIPO Notice of Allowance issued in Korean Patent Application No. 10-2011-0101798 dated Feb. 21, 2014 (with English Translation).

(Continued)

*Primary Examiner* — Thjuan K Addy
(74) *Attorney, Agent, or Firm* — RatnerPrestia

(57) ABSTRACT

Disclosed are a call processing supplementary service providing terminal device and an operation method thereof. The device includes: terminal operator configured to detect current state of the terminal device and provide an event signal corresponding to the detected current state; and a service provider configured to, when at least one of a voice call origination attempt state and a voice call end state is detected through the event signal, provide pre-registered additional content corresponding to the voice call. Accordingly, a call supplementary service can be conveniently provided without intervention of a communication service provider.

16 Claims, 9 Drawing Sheets

(56) References Cited

FOREIGN PATENT DOCUMENTS

| | | |
|---|---|---|
| KR | 10-2011-0077601 A | 7/2011 |
| WO | WO 2011-068372 A2 | 6/2011 |

OTHER PUBLICATIONS

KIPO Notice to File a Response issued in Korean Patent Application No. 10-2011-0101798 dated May 30, 2013 (with English Translation).

KIPO Notice to File a Response issued in Korean Patent Application No. 10-2011-0101798 dated Sep. 24, 2012 (with English Translation).

International Search Report for PCT/KR2012/007739 mailed Feb. 7, 2013.

Japanese Official Action issued in JP 2014-534465 dated Sep. 24, 2014.

* cited by examiner

US 8,938,056 B2

TERMINAL EQUIPMENT FOR PROVIDING AN ADDITIONAL CALL PROCESSING SERVICE, AND METHOD FOR OPERATING SAME

This application is the U.S. National Phase Application of PCT/KR2012/007739, filed Sep. 26, 2012, which claims priority of Korean Patent Application No. 10-2011-0101798, filed Oct. 6, 2011, the contents of such applications being incorporated by reference herein.

BACKGROUND OF THE INVENTION

1. Field of the Invention

The present disclosure relates to a method of providing a call processing supplementary service, and more particularly to a terminal device providing a call processing supplementary service and an operation method thereof which detect the current state of the terminal device including a call processing state through an interworking with an Operating System (OS) and provide the additional content pre-registered by a user to an originator/terminator in accordance with the detected current state.

2. Description of the Prior Art

Recently, due to the development of communication technologies, user's demands for various supplementary services as well as a basic voice call function have increased in a conventional wired/wireless call service field.

In connection with this, information on a terminal of a customer can be identified through a communication service provider and a content providing service through a wireless Internet can be provided when a voice call connection is made using a service provided by the communication service provider network.

However, in this case, it is required to construct a cooperation relation with all communication service providers within the corresponding area and interwork with all related systems. Accordingly, it takes long time to process such a business, and some services are limited if some of the communication service providers do not want to provide the services

SUMMARY OF THE INVENTION

The present disclosure has been made to solve the problems and an aspect of the present disclosure is to provide a convenient call supplementary service without intervention of a communication service provider by detecting a current state of a terminal device including a call processing state through an interworking with an Operating System (OS) and providing an additional content pre-registered by the user to an originator/terminator in accordance with the detected current state.

In accordance with a first aspect of the present disclosure, a terminal device is provided. The terminal device includes: a terminal operator configured to detect current state of the terminal device and provide an event signal corresponding to the detected current state; and a service provider configured to, when at least one of a voice call origination attempt state and a voice call end state is detected through the event signal, provide pre-registered additional content corresponding to the voice call.

When at least one of the voice call origination attempt state and the voice call end state is detected through the event signal, the service provider may provide pre-registered additional content corresponding to originator identification information or terminator identification information of the voice call.

When at least one of the voice call origination attempt state and the voice call end state is detected through the event signal, the service provider may provide pre-registered additional content corresponding to originator identification information or terminator identification information of the voice call by switching operation state to an active state.

When a voice call connection state is detected through the event signal after the voice call origination attempt state or an attempt of the voice call by an originator is detected after a voice call connection, the service provider may stop providing the additional content by switching operation state to an inactive state.

In accordance with a second aspect of the present disclosure, a terminal device is provided. The terminal device includes: a terminal operator configured to detect current state of the terminal device and provides an event signal corresponding to the detected current state; and a service provider configured to, when at least one of a voice call termination attempt state and a voice call end state is detected through the event signal, provide pre-registered additional content corresponding to the voice call.

When at least one of the voice call termination attempt state and the voice call end state is detected through the event signal, the service provider may provide pre-registered additional content corresponding to originator identification information and terminator identification information of the voice call.

When a Short Message Service (SMS) reception state is detected through the event signal, the service provider may provide pre-registered additional content corresponding to originator identification information and terminator identification information of the SMS.

When an event signal corresponding to at least one of the voice call termination attempt state and the voice call end state is received, the service provider may provide pre-registered additional content corresponding to originator identification information and terminator identification information of the voice call by switching operation state to an active state.

When a voice call connection state is detected through the event signal after the voice call termination attempt state, the service provider may stop providing additional content by switching operation state to an inactive state.

In accordance with a third aspect of the present disclosure, an operation method of a terminal device is provided. The operation method includes: detecting current state of the terminal device and generating an event signal corresponding to the detected current state; identifying the current state of the terminal device corresponding to the event signal; and when at least one of a voice call origination attempt state and a voice call end state is detected through the event signal, providing pre-registered additional content corresponding to the voice call.

The providing of the pre-registered additional content may include, when at least one of the voice call origination attempt state and the voice call end state is detected, providing pre-registered additional content corresponding to originator identification information or terminator identification information of the voice call.

The providing of the pre-registered additional content may include, when an event signal corresponding to at least one of the voice call origination attempt state and the voice call end state is generated, providing pre-registered additional content corresponding to originator identification information or terminator identification information of the voice call by switching operation state to an active state.

The operation method may further include when a voice call connection state is detected through the event signal after the voice call origination attempt state or an attempt of a voice call by an originator is detected after a voice call connection, stopping the providing of additional content by switching operation state to an inactive state.

In accordance with a fourth aspect of the present disclosure, an operation method of a terminal device is provided. The operation method includes: detecting current state of the terminal device and generating an event signal corresponding to the detected current state; identifying the current state of the terminal device corresponding to the event signal; and when at least one of a voice call termination attempt state and a voice call end state is detected through the event signal, providing pre-registered additional content corresponding to the voice call.

The providing of the pre-registered additional content may include, when at least one of the voice call termination attempt state and the voice call end state is detected through the event signal, providing pre-registered additional content corresponding to originator identification information and terminator identification information of the voice call.

The providing of the pre-registered additional content may include, when a Short Message Service (SMS) reception state is detected through the event signal, providing pre-registered additional content corresponding to originator identification information and terminator identification information of the SMS.

The providing of the pre-registered additional content may include, when an event signal corresponding to at least one of the voice call termination attempt state and the voice call end state is generated, providing pre-registered additional content corresponding to originator identification information and terminator identification information of the voice call by switching operation state to an active state.

The operation method may further include, when a voice call connection state is detected through the event signal after the voice call termination attempt state, stopping the providing of the additional content by switching operation state to an inactive state.

In accordance with a fifth aspect of the present disclosure, a computer-readable recording medium including commands is provided. The command executes: detecting an event signal generated in accordance with current state of a terminal device; identifying at least one of a voice call origination attempt state and a voice call end state through the event signal; and providing pre-registered additional content corresponding to originator identification information or terminator identification information of the voice call according to the identification of at least one of the voice call origination attempt state and the voice call end state.

The computer-readable recording medium may further include a command configured to execute, when a voice call connection state is detected through the event signal after the voice call origination attempt state or an attempt of the voice call by an originator is detected after a voice call connection, stopping the providing of additional content by switching operation state to an inactive state.

In accordance with a first aspect of the present disclosure, a computer-readable recording medium including commands is provided. The commands executes: detecting an event signal generated in accordance with a current state of a terminal device; identifying at least one of a voice call termination attempt state and a voice call end state through the event signal; and providing pre-registered additional content corresponding to originator identification information or terminator identification information of a voice call according to the identification of at least one of the voice call termination attempt state and the voice call end state.

The computer-readable recording medium may further include a command configured to execute, when a voice call connection state is detected through the event signal after the voice call termination attempt state, stopping the providing of additional content.

Based on a call processing supplementary service providing terminal device according to the present disclosure, a current state of a terminal device including a call processing state is detected through an interworking with an Operating System (OS) and an additional content pre-registered by a user is provided to an originator/terminator in accordance with the detected current state. As a result, a call supplementary service can be conveniently provided without intervention of communication service providers.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of the present disclosure will be described with reference to the accompanying drawings.

Figure 1:
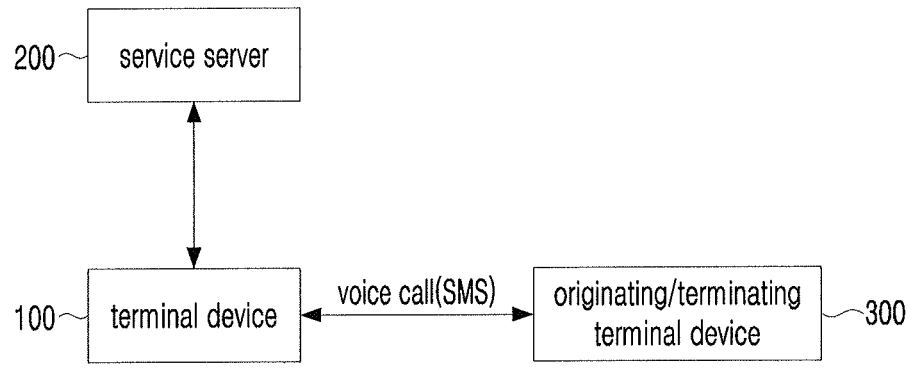
FIG. 1 schematically illustrates a configuration of a call processing supplementary service providing system according to an embodiment of the present disclosure.

FIG. 1 schematically illustrates a configuration of a call processing supplementary service providing system according to an embodiment of the present disclosure.

As illustrated in FIG. 1, the system includes a terminal device 100 providing additional content corresponding to a call processing procedure through driving of an application installed to provide the additional content, a service server 200 which, when a subscriber, that is, an originating or terminating terminal device 300 having downloaded and installed the application for providing the additional content registers a new content, transmits the registered new content by updating the terminal device 100 and directly provides the additional content according to a request of the terminal device 100 or provides the additional content through an interworking with another content server (not shown), and the originating/terminating terminal device 300 performing call processing including a short text message and a voice call with the terminal device 100. The terminal device 100 refers to a smart phone which is equipped with a platform for operating the terminal device, for example, iPhone OS (iOS), Android, Window Mobile or the like and thus can access the wireless Internet based on the corresponding platform during a voice call.

Hereinafter, a structural characteristic corresponding to a voice call originating operation according to the first embodiment of the present disclosure will be described with reference to the configuration of FIG. 1.

The terminal device 100 receives the additional content newly registered by the terminating terminal device 300 from the service server 200.

More specifically, the terminal device 100 receives the additional content newly registered by the terminating terminal device 300 from the service server 200 in a process of updating an application installed to provide the additional content.

Further, the terminal device 100 registers additional content corresponding to terminator identification information.

More specifically, the terminal device 100 transmits additional contents corresponding to a phone number of the terminating terminal device 300, for example, image information, an image, a text and the like to the installed application and registers the additional contents.

At this time, in registering the additional content, the terminal device 100 may register the original content or register access information (for example, URL) of the additional content and thus access the corresponding content based on the access information registered when the additional content is provided.

Based on the above description, the terminal device 100 detects the current state and generates an event signal corresponding to the detected current state.

More specifically, the terminal device 100 monitors the current state through an Operating System (OS) to detect a voice call origination attempt state and generates an event signal corresponding to the detected voice call origination attempt state, so as to transmit the corresponding event signal to an application installed to provide the additional content through the platform. In connection with this, the OS transmits the event signal including a termination number input by a user to the platform according to the detected voice call origination attempt state and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the voice call origination attempt state.

Further, when the voice call origination attempt state is identified through the event signal, the terminal device 100 provides pre-registered additional content corresponding to the voice call.

More specifically, when the voice call origination attempt state is identified through the installed application, the terminal device 100 inquires about whether a service of the termination number included in the event signal is registered to identify a service registration state, inquires about a registered additional content corresponding to a corresponding termination subscriber, and displays the corresponding content on a display device. In connection with this, when the content corresponding to the termination subscriber is registered, the terminal device 100 extracts the corresponding content and provides the extracted content. When only access information of the corresponding content is registered, the terminal device 100 acquires the content based on the corresponding access information and provides the acquired content. Meanwhile, when the terminal device 100 receives a request for additional content mapped to the additional content provided from a user, the terminal device 100 may acquire the corresponding content from the service server 200 and provide the acquired content to the user.

Meanwhile, when a voice call connection state is detected or an originator attempts a voice call after the voice call connection, the terminal device 100 stops providing the additional content.

More specifically, when the voice call connection state is detected through the event signal after the voice call origination attempt state or it is determined that the voice call attempt of the originator is made after the voice call connection, the terminal device 100 stops providing additional content. In connection with this, for example, when a state where the originator holds the terminal device to his/her ear is detected through an installed proximity sensor or a voice input of an originator is detected, the OS generates an event signal corresponding to the detection and allows the application to detect a voice call attempt of the originator, that is, a user's call intention. In response to the detection of the user's call intention, the application switches an operation state to an inactive state to stop providing the additional content and displays a call screen (screen providing use of additional functions such as a keypad, a speaker, and a mute function) provided by the OS itself in connection with call processing instead of the additional content displayed on the display device, so that the user can use functions related with call provided by the OS, for example, a button input, a memo, a speakerphone function and the like.

Hereinafter, a structural characteristic corresponding to a voice call terminating operation according to the second embodiment of the present disclosure will be described with reference to the configuration of FIG. 1.

The terminal device 100 receives additional content newly registered by an originating terminal device 300 from a service server 200.

More specifically, the terminal device 100 receives the additional content newly registered by the originating terminal device 300 from the service server 200 during a process of updating an application installed to provide the additional content.

Further, the terminal device 100 registers additional content corresponding to identification information of a terminator.

More specifically, the terminal device 100 transmits additional contents corresponding to a phone number of the originating terminal device 300, for example, image information, an image, a text and the like to the installed application and registers the additional contents. At this time, in registering the additional content, the terminal device 100 may register the original content or register access information (for example, URL) of the additional content so as to access the corresponding content based on the access information registered when the additional content is provided.

Based on the above description, the terminal device 100 detects the current state and generates an event signal corresponding to the detected current state. More specifically, the terminal device 100 monitors the current state through an Operating System (OS) to detect a voice call termination attempt state and generates an event signal corresponding to the detected voice call termination attempt state, so as to transmit the corresponding event signal to an application installed to provide the additional content through the platform. In connection with this, the OS transmits the event signal including an origination number to the platform according to the detected voice call termination attempt state and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the voice call termination attempt state.

Further, when the voice call termination attempt state is detected through the event signal, the terminal device 100 provides pre-registered additional content corresponding to a voice call.

More specifically, when a voice call termination attempt state is detected by the installed application, the terminal device 100 inquires about whether a service of the origination number included in an event signal is registered to identify a service registration state, inquires about a registered additional content corresponding to a corresponding origination subscriber, and displays the corresponding content on a display device. In connection with this, when the content corresponding to the origination subscriber is registered, the terminal device 100 extracts the corresponding content and provides the extracted content. When only access information of the corresponding content is registered, the terminal device 100 acquires the content based on the corresponding access information and provides the acquired content. Meanwhile, when the terminal device 100 receives a request for additional content mapped to the additional content provided from the user, the terminal device 100 may acquire a corresponding content from the service server 200 and provide the acquired content to the user.

Meanwhile, the terminal device 100 stops providing the additional content when a voice call connection state is detected.

More specifically, when the voice call connection state is detected through the event signal after the voice call termination attempt state, the terminal device 100 stops providing the additional content. In connection with this, when a call connection button input of a user is detected in response to the voice call termination, the OS generates an event signal corresponding to the corresponding state and allows the application to detect the voice call connection state. In response to the detection of the voice call connection state, the application switches an operation state to an inactive state to stop providing the additional content and displays a call screen (screen providing the use of additional functions such as a keypad, a speaker, and a mute function) provided by the OS in connection with call processing instead of the additional content displayed on the display device, so that the user can use call related functions provided by the OS, for example, a button input, a memo, a speakerphone function and the like.

Hereinafter, a structural characteristic corresponding to a voice call ending operation according to the third embodiment of the present disclosure will be described with reference to the configuration of FIG. 1.

The terminal device 100 receives additional content newly registered by the originating/terminating terminal device 300 from the service server 200.

More specifically, the terminal device 100 receives the additional content newly registered by a call connection counterpart, that is, the originating/terminating terminal device 300 from the service server 200 in a process of updating an application installed to provide the additional content.

Further, the terminal device 100 registers additional content corresponding to originator/terminator identification information.

More specifically, the terminal device 100 transmits additional contents corresponding to a phone number of the originating/terminating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Based on the above description, the terminal device 100 detects the current state and generates an event signal corresponding to the detected current state.

More specifically, the terminal device 100 monitors the current state through an Operating System (OS) to detect switching from a voice call connection state to a voice call end state and generates an event signal corresponding to the detected voice call end state, so as to transmit the corresponding event signal to an application installed to provide the additional content through the platform.

In connection with this, the OS transmits the event signal including a counterpart number to the platform according to the detected voice call end state and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to an active state, so as to allow the application to recognize the voice call end state.

Further, when a voice call end state is detected through the event signal, the terminal device 100 provides pre-registered additional content corresponding to the voice call.

More specifically, when a voice call end state is detected by the installed application, the terminal device 100 inquires about whether a service of the counterpart number included in the event signal is registered to identify a service registration state, and inquires about a registered additional content corresponding to a corresponding subscriber to display the corresponding content on a display device. In connection with this, when the content corresponding to the counterpart subscriber is registered, the terminal device 100 extracts the corresponding content and provides the extracted content. When only access information of the corresponding content is registered, the terminal device 100 acquires the content based on the corresponding access information and provides the acquired content. Meanwhile, when the terminal device 100 receives a request for additional content mapped to the additional content provided from a user, the terminal device 100 may acquire the corresponding content from the service server 200 and provide the acquired content to the user.

Hereinafter, a structural characteristic corresponding to a short text message receiving operation according to the fourth embodiment of the present disclosure will be described with reference to the configuration of FIG. 1.

The terminal device 100 receives additional content newly registered by the originating terminal device 300 from the service server 200.

More specifically, the terminal device 100 receives the additional content newly registered by the originating terminal device 300 from the service server 200 in a process of updating an application installed to provide the additional content.

Further, the terminal device 100 registers additional content corresponding to originator identification information.

More specifically, the terminal device 100 transmits additional contents corresponding to a phone number of the originating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Based on the above description, the terminal device 100 detects the current state and generates an event signal corresponding to the detected current state.

More specifically, the terminal device 100 monitors the current state through an Operating System (OS) to detect a Short Message Service (SMS) reception state and generates an event signal corresponding to the detected SMS reception state, so as to transmit the corresponding event signal to an application installed to provide the additional content through the platform. In connection with this, the OS transmits the event signal including an origination number to the platform according to the detected SMS reception state and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the SMS reception state.

Further, when the SMS reception state is detected through the event signal, the terminal device 100 provides pre-registered additional content.

More specifically, when the SMS reception state is detected by the installed application, the terminal device 100 inquires about whether a service of the origination number included in the event signal is registered to identify a service registration state, inquires about a registered additional content corresponding to a corresponding origination subscriber, and displays the corresponding content on a display device. In connection with this, when the content corresponding to the origination subscriber is registered, the terminal device 100 extracts the corresponding content and provides the extracted content. When only access information of the corresponding content is registered, the terminal device 100 acquires the content based on the corresponding access information and provides the acquired content. Meanwhile, when the terminal device 100 receives a request for additional content mapped to the additional content provided from a user, the terminal device 100 may acquire the corresponding content from the service server 200 and provide the acquired content to the user.

Figure 2:
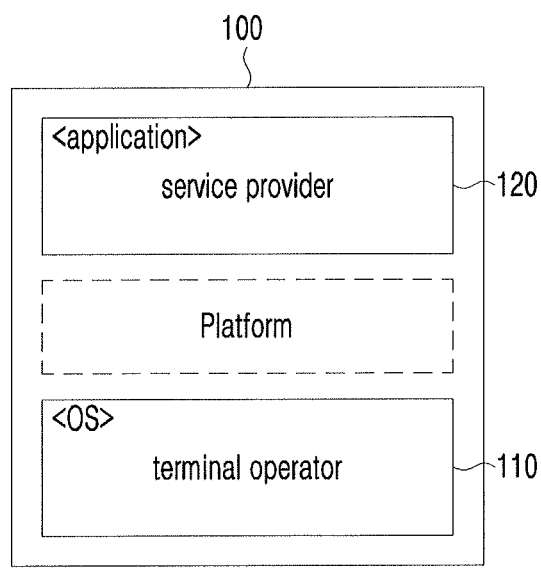
FIG. 2 schematically illustrates a configuration of a terminal device according to an embodiment of the present disclosure.

Hereinafter, a more detailed configuration of the terminal device 100 according to an embodiment of the present disclosure will be described with reference to FIG. 2.

That is, the terminal device 100 includes a terminal operator 110 detecting the current state and providing an event signal corresponding to the detected current state, and a service provider 120 identifying a call processing state through the event signal and providing pre-registered additional control in accordance with the identified call processing state. The terminal operator 110 refers to an Operating System (OS) installed in the terminal device 100 and the service provider 120 refers to an application. The service provider 120 is installed based on a platform supported by the OS and provides additional content related to the call processing.

Hereinafter, a structural characteristic of the terminal device 100 corresponding to the voice call originating operation according to the first embodiment of the present disclosure will be described with reference to the configuration of FIG. 2.

The service provider 120 registers additional content corresponding to terminator identification information.

More specifically, the service provider 120 registers additional contents corresponding to a phone number of the terminating terminal device 300, for example, image information, an image, a text and the like. At this time, in registering the additional content, the service provider 120 may register the original content or register access information (for example, URL) of the additional content and thus access the corresponding content based on the access information registered when the additional content is provided.

The terminal operator detects the current state of the terminal device 100 and generates an event signal corresponding to the detected current state.

More specifically, the terminal operator 110 monitors the current state of the terminal device 100 to detect a voice call origination attempt state and generates an event signal corresponding to the detected voice call origination attempt state, so as to transmit the corresponding event signal to the service provider 120 through the platform. In connection with this, the terminal operator 110 transmits the event signal including a termination number input by a user to the platform according to the detected voice call origination attempt state and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the OS to the service provider 120 and switches the state of the service provider 120 to the active state, so as to allow the service provider 120 to recognize the voice call origination attempt state.

Further, when the voice call origination attempt state is detected through the event signal, the service provider 120 provides pre-registered additional content corresponding to the voice call.

More specifically, when the voice call origination attempt state is detected by the installed application, the service provider 120 inquires about whether a service of the termination number included in the event signal is registered to identify a service registration state, inquires about a registered additional content corresponding to a corresponding termination subscriber, and displays the corresponding content on a display device. In connection with this, when the content corresponding to the termination subscriber is registered, the service provider 120 extracts the corresponding content and provides the extracted content. When only access information of the corresponding content is registered, the service provider 120 acquires the content based on the corresponding access information and provides the acquired content. Meanwhile, when the service provider 120 receives a request for additional content mapped to the additional content provided from a user, the service provider 120 may acquire the corresponding content from the service server 200 and provide the acquired content to the user.

Meanwhile, when a voice call connection state is detected or an originator attempts a voice call after the voice call connection, the service provider 120 stops providing the additional content.

More specifically, when the voice call connection state is detected through the event signal after the voice call origination attempt state or it is determined that the voice call attempt of the originator is made after the voice call connection, the service provider 120 stops providing additional content. In connection with this, for example, when a state where the originator holds the terminal device to his/her ear is detected through an installed proximity sensor or a voice input of the originator is detected, the terminal operator generates an event signal corresponding to the detection and allows the service provider 120 to detect a voice call attempt of the originator, that is, a user's call intention. In response to the detection of the user's call intention, the service provider 120 switches an operation state to an inactive state to stop providing the additional content and displays a call screen (screen providing the use of additional functions such as a keypad, a speaker, and a mute function) provided by the terminal operator 110 itself in connection with call processing instead of the additional content displayed on the display device, so that the user can use functions related with call provided by the terminal operator 110, for example, a button input, a memo, a speakerphone function and the like.

Hereinafter, a structural characteristic of the terminal device 100 corresponding to the voice call terminating operation according to the second embodiment of the present disclosure will be described with reference to the configuration of FIG. 2.

The service provider 120 registers additional content corresponding to originator identification information.

More specifically, the service provider 120 registers additional contents corresponding to a phone number of the originating terminal device 300, for example, image information, an image, a text and the like. At this time, in registering the additional content, the service provider 120 may register the original content or register access information (for example, URL) of the additional content and thus access the corresponding content based on the access information registered when the additional content is provided.

The terminal operator 110 detects the current state of the terminal device 100 and generates an event signal corresponding to the detected current state.

More specifically, the terminal operator 110 monitors the current state of the terminal device 100 to detect a voice call termination attempt state and generates an event signal corresponding to the detected voice call termination attempt state, so as to transmit the corresponding event signal to the service provider 120 through the platform. In connection with this, the terminal operator 110 transmits the event signal including an origination number input by a user to the platform according to the detected voice call termination attempt state and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the terminal operator 110 to the service provider 120 and switches the state of the service provider 120 to the active state, so as to allow the service provider 120 to recognize the voice call termination attempt state.

Further, when the voice call termination attempt state is detected through the event signal, the service provider 120 provides pre-registered additional content corresponding to the voice call.

More specifically, when the voice call termination attempt state is detected by the installed application, the service provider 120 inquires about whether a service of the origination number included in the event signal is registered to identify a service registration state, inquires about a registered additional content corresponding to a corresponding origination subscriber, and displays the corresponding content on a display device. In connection with this, when the content corresponding to the origination subscriber is registered, the service provider 120 extracts the corresponding content and provides the extracted content. When only access information of the corresponding content is registered, the service provider 120 acquires the content based on the corresponding access information and provides the acquired content. Meanwhile, when the service provider 120 receives a request for additional content mapped to the additional content provided from a user, the service provider 100 may acquire the corresponding content from the service server 200 and provide the acquired content to the user.

Meanwhile, the service provider 120 stops providing the additional content when a voice call connection state is detected.

More specifically, when the voice call connection state is detected through the event signal after the voice call termination attempt state, the service provider 120 stops providing additional content. In connection with this, when a call connection button input of the user is detected in response to the voice call termination, the terminal operator generates an event signal corresponding to the corresponding state and allows the service provider 120 to detect the voice call connection state. In response to the detection of the user's call intention, the service provider 120 switches an operation state to an inactive state to stop providing the additional content and displays a call screen (screen providing the use of additional functions such as a keypad, a speaker, and a mute function) provided by the terminal operator 110 itself in connection with call processing instead of the additional content displayed on the display device, so that the user can use functions related with call provided by the terminal operator, for example, a button input, a memo, a speakerphone function and the like.

Hereinafter, a structural characteristic of the terminal device 100 corresponding to the voice call ending operation according to the third embodiment of the present disclosure will be described with reference to the configuration of FIG. 2.

The service provider 120 registers additional content corresponding to originator/terminator identification information.

More specifically, the service provider 120 registers additional contents corresponding to a phone number of the originating/terminating terminal device 300, for example, image information, an image, a text and the like. At this time, in registering the additional content, the service provider 120 may register the original content or register access information (for example, URL) of the additional content and thus access the corresponding content based on the access information registered when the additional content is provided.

The terminal operator 110 detects the current state and generates an event signal corresponding to the detected current state.

More specifically, the terminal operator 110 monitors the current state of the terminal device 100 to detect switching from a voice call connection state to a voice call end state and generates an event signal corresponding to the detected voice call end state, so as to transmit the corresponding event signal to the service provider 120 through the platform. In connection with this, the terminal operator transmits the event signal including a counterpart number to the platform according to the detected voice call end state and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the terminal operator 120 to the service provider 120 and switches the state of the service provider 120 to the active state, so as to allow the service provider 120 to recognize the voice call end state.

Further, when the voice call end state is detected through the event signal, the service provider 120 provides pre-registered additional content corresponding to the voice call.

More specifically, when the voice call end state is detected through the event signal, the service provider 120 inquires about whether a service of the counterpart number included in the event signal is registered to identify a service registration state, inquires about a registered additional content corresponding to a corresponding subscriber, and displays the corresponding content on a display device. In connection with this, when the content corresponding to the counterpart subscriber is registered, the service provider 120 extracts the corresponding content and provides the extracted content. When only access information of the corresponding content is registered, the service provider 100 acquires the content based on the corresponding access information and provides the acquired content. Meanwhile, when the service provider 120 receives a request for additional content mapped to the additional content provided from a user, the service provider 120 may acquire the corresponding content from the service server 200 and provide the acquired content to the user.

Hereinafter, a structural characteristic of the terminal device 100 corresponding to the SMS receiving operation according to the fourth embodiment of the present disclosure will be described with reference to the configuration of FIG. 2.

Further, the terminal device 100 registers additional content corresponding to originator identification information.

More specifically, the service provider 120 transmits additional contents corresponding to a phone number of the originating terminal device 300, for example, image information, an image, a text and the like to the installed application and registers the additional contents. At this time, in registering the additional content, the service provider 120 may register the original content or register access information (for example, URL) of the additional content and thus access the corresponding content based on the access information registered when the additional content is provided.

The terminal operator 110 detects the current state and generates an event signal corresponding to the detected current state.

More specifically, the terminal operator 110 monitors the current state of the terminal device 100 to detect an SMS reception state and generates an event signal corresponding to the detected SMS reception state, so as to transmit the corresponding event signal to the service provider 120 through the platform. In connection with this, the terminal operator 110 transmits the event signal including an origination number to the platform according to the detected SMS reception state and the event signal transmitted to the platform is differently transmitted according to whether the service provider 120 is activated. In other words, when the service provider 120 is in an active (driving) state, the service provider 120 acquires by itself the event signal transmitted from the terminal operator 110 through continuous monitoring of the platform. In contrast, when the service provider 120 is in an inactive (non-driving) state, the platform transmits the event signal transmitted from the terminal operator 110 to the service provider 120 and switches the state of the service provider 120 to the active state, so as to allow the service provider 120 to recognize the SMS reception state.

Further, when the SMS reception state is detected through the event signal, the service provider 120 provides pre-registered additional content.

More specifically, when the SMS reception state is detected by the event signal, the service provider 120 inquires about whether a service of the origination number included in the event signal is registered to identify a service registration state, inquires about a registered additional content corresponding to a corresponding origination subscriber, and displays the corresponding content on a display device. In connection with this, when the content corresponding to the origination subscriber is registered, the service provider 120 extracts the corresponding content and provides the extracted content. When only access information of the corresponding content is registered, the service provider 120 acquires the content based on the corresponding access information and provides the acquired content. Meanwhile, when the service provider 120 receives a request for additional content mapped to the additional content provided from the user, the service provider 120 may acquire the corresponding content from the service server 200 and provide the acquired content to the user.

As described above, based on the call processing supplementary service system according to the present disclosure, the current state of the terminal device including the call processing state is detected through an interworking with the OS and the pre-registered additional content by the user is provided to the originator/terminator in accordance with the detected current state. As a result, a call supplementary service can be conveniently provided without intervention of a communication service provider. Further, since a service user can identify in advance an image of an origination/termination counterpart authorized through a service registration in origination/termination before a call connection, the user can trust an identity of the origination counterpart and use information provided by the origination counterpart, thereby preventing various voice phishing attacks in advance. Moreover, when a voice call connection state or a user's call intention is detected, a call screen provided by the OS itself in connection with call processing instead of the additional content displayed on the display device is displayed, and accordingly, various types of additional contents can be provided to the user who desires to use a voice call without any inconvenience. Therefore, the utilization of the service can increase. Furthermore, just after a call ends, a call center may conduct a survey for customer satisfaction through the screen of the terminal device to increase a participation rate.

Hereinafter, a call processing supplementary service method according to an embodiment of the present disclosure will be described with reference to FIGS. 3 to 10. Configurations described in FIGS. 1 to 2 are assigned the same reference numerals for the convenience of description.

Figure 3:
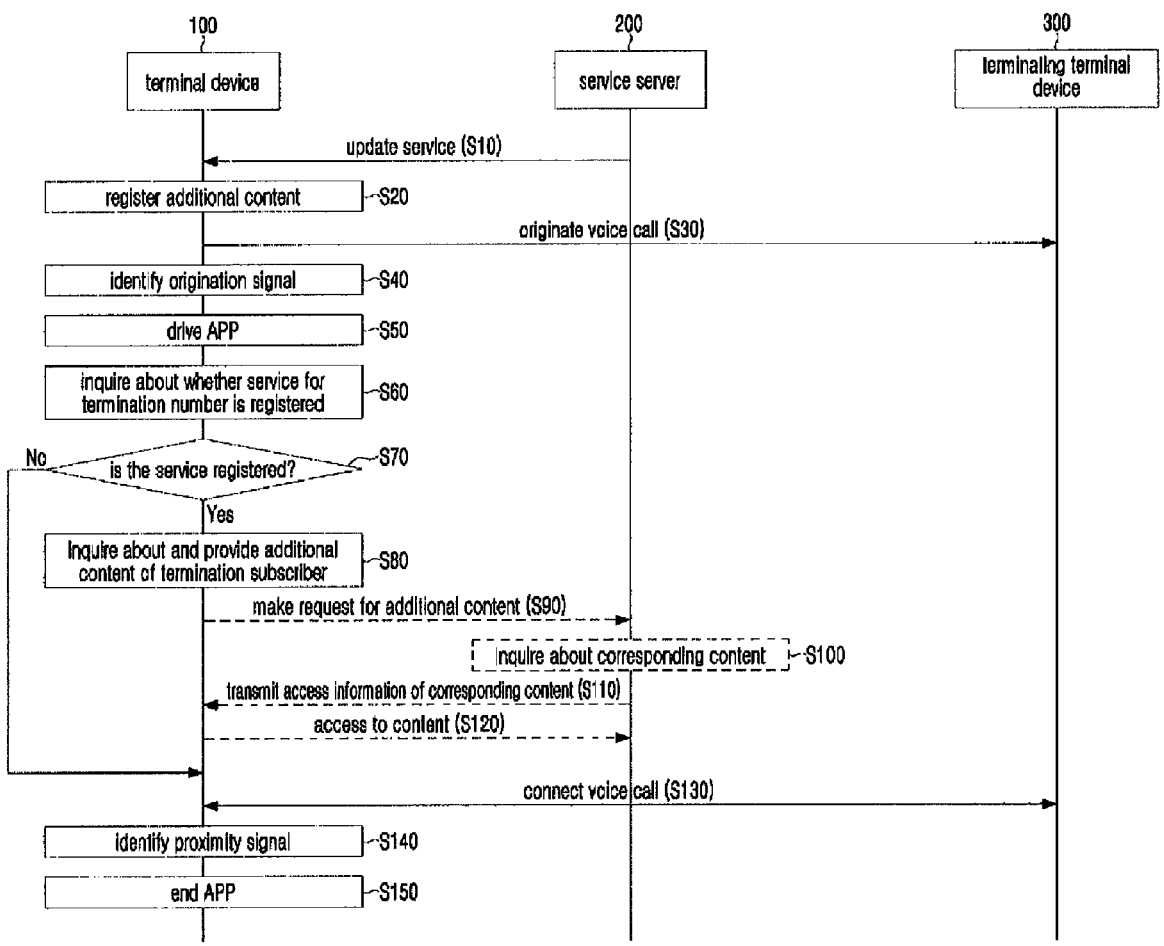
FIG. 3 is a flowchart illustrating an operation method of a call processing supplementary service providing system according to a first embodiment of the present disclosure.

First, an operation method of the call processing supplementary service system corresponding to the voice call originating operation according to the first embodiment of the present disclosure will be described with reference to FIG. 3.

The terminal device 100 first receives the additional content newly registered by the terminating terminal device 300 from the service server 200.

Preferably, the terminal device 100 receives the additional content newly registered by the terminating terminal device 300 from the service server 200 in a process of updating an application installed to provide the additional content.

Then, the terminal device 100 registers additional content corresponding to terminator identification information.

Preferably, the terminal device 100 transmits additional contents corresponding to a phone number of the terminating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Then, the terminal device 100 detects the current state and generates an event signal corresponding to the detected current state in S30 to S50.

Preferably, the terminal device 100 monitors the current state through an Operating System (OS) to detect a voice call origination attempt state and generates an event signal corresponding to the detected voice call origination attempt state, so as to transmit the corresponding event signal to an application installed to provide the additional content through the platform. In connection with this, the OS transmits the event signal including a termination number input by a user according to the detected voice call origination attempt state to the platform and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the voice call origination attempt state.

Next, when the voice call origination attempt state is detected through the event signal, the terminal device 100 provides pre-registered additional content corresponding to the voice call in S60 to S80.

Preferably, when the voice call origination attempt state is detected through the installed application, the terminal device 100 inquires about information on whether a service for the termination number is registered included in the event signal to identify a service registration state, inquires about a registered additional content corresponding to a corresponding termination subscriber, and displays the corresponding content on a display device. In connection with this, when the content corresponding to the termination subscriber is registered, the terminal device 100 extracts the corresponding content and provides the extracted content. When only access information of the corresponding content is registered, the terminal device 100 acquires the content based on the corresponding access information and provides the acquired content.

Meanwhile, when the terminal device 100 receives a request for additional content mapped to the additional content provided from a user, the terminal device 100 may acquire the corresponding content from the service server 200 and provide the acquired content to the user in S90 to S120.

Thereafter, when a voice call connection state is detected or an originator attempts a voice call after the voice call connection, the terminal device 100 stops providing the additional content in S130 to S150.

Preferably, when the voice call connection state is detected through the event signal after the voice call origination attempt state or it is determined that the voice call attempt of the originator is made after the voice call connection, the terminal device 100 stops providing additional content. In connection with this, for example, when a state where the originator holds the terminal device to his/her ear is detected through an installed proximity sensor or a voice input of the originator is detected, the OS generates an event signal corresponding to the detection and allows the application to detect a voice call attempt of the originator, that is, a user's call intention. In response to the detection of the user's call intention, the application switches an operation state to an inactive state to stop providing the additional content and displays a call screen (screen providing the use of additional functions such as a keypad, a speaker, and a mute function) provided by the OS itself in connection with call processing instead of the additional content displayed on the display device, so that the user can use functions related with call provided by the OS, for example, a button input, a memo, a speakerphone function and the like.

Figure 4:
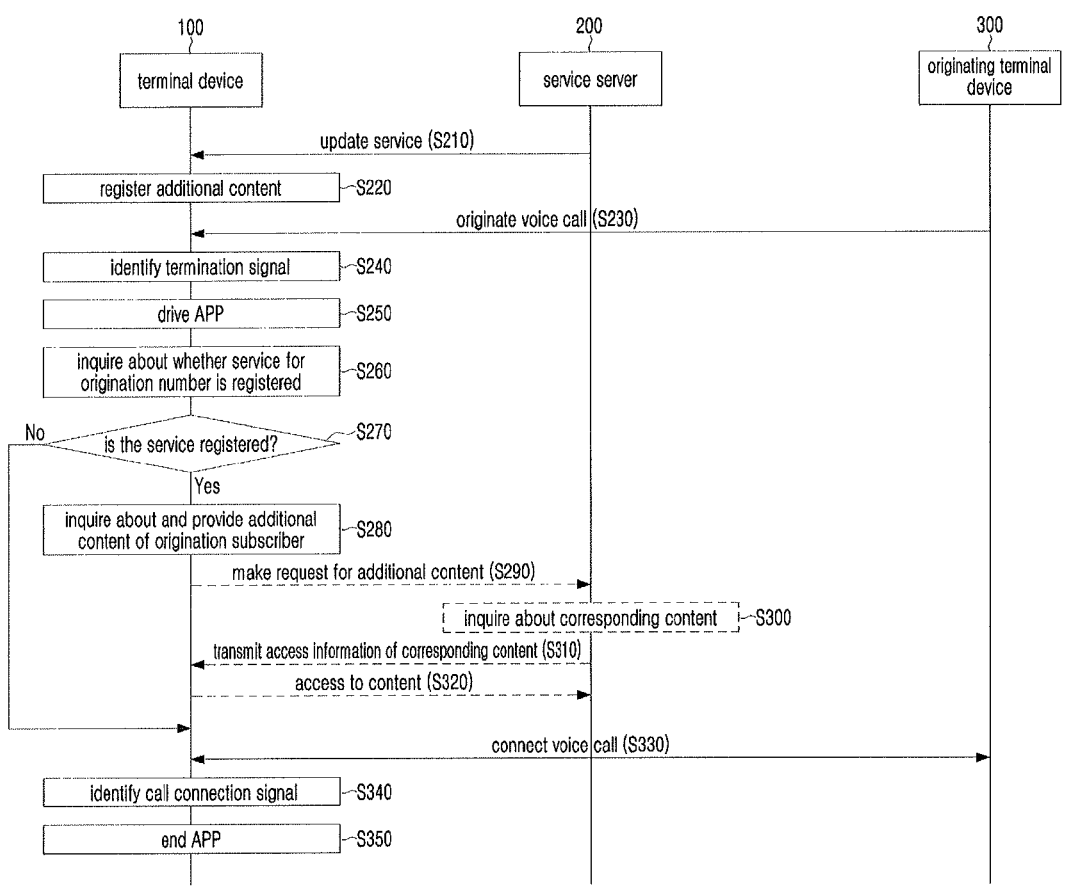
FIG. 4 is a flowchart illustrating an operation method of a call processing supplementary service providing system according to a second embodiment of the present disclosure.

Hereinafter, an operation method of the call processing supplementary service system corresponding to the voice call terminating operation according to the second embodiment of the present disclosure will be described with reference to FIG. 4.

The terminal device 100 first receives additional content newly registered by the originating terminal device 300 from the service server 200 in S110.

Preferably, the terminal device 100 receives the additional content newly registered by the originating terminal device 300 from the service server 200 in a process of updating an application installed to provide the additional content.

Then, the terminal device 100 registers additional content corresponding to originator identification information in S220.

Preferably, the terminal device 100 transmits additional contents corresponding to a phone number of the originating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Then, the terminal device 100 detects the current state and generates an event signal corresponding to the detected current state in S230 to S250.

Preferably, the terminal device 100 monitors the current state through an Operating System (OS) to detect a voice call termination attempt state and generates an event signal corresponding to the detected voice call termination attempt state, so as to transmit the corresponding event signal to an application installed to provide the additional content through the platform. In connection with this, the OS transmits the event signal including an origination number according to the detected voice call termination attempt state to the platform and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the voice call termination attempt state.

Next, when the voice call termination attempt state is detected through the event signal, the terminal device 100 provides pre-registered additional content corresponding to the voice call in S260 to S280.

Preferably, when the voice call termination attempt state is detected by the installed application, the terminal device 100 inquires about information on whether a service of the origination number is registered included in the event signal to identify a service registration state, inquires about a registered additional content corresponding to a corresponding origination subscriber, and display the corresponding content on a display device. In connection with this, when the content corresponding to the origination subscriber is registered, the terminal device 100 extracts the corresponding content and provides the extracted content. When only access information of the corresponding content is registered, the terminal device 100 acquires the content based on the corresponding access information and provides the acquired content.

Meanwhile, when the terminal device 100 receives a request for additional content mapped to the additional content provided from a user, the terminal device 100 may acquire the corresponding content from the service server 200 and provide the acquired content to the user in S290 to S320.

Thereafter, the terminal device 100 stops providing the additional content when a voice call connection state is detected in S330 to S350.

Preferably, when the voice call connection state is detected through the event signal after the voice call termination attempt state, the terminal device 100 stops providing additional content. In connection with this, when a call connection button input of the user is detected in response to the voice call termination, the OS generates an event signal corresponding to the corresponding state and allows the application to detect the voice call connection state. In response to the detection of the voice call connection state, the application switches an operation state to an inactive state to stop providing the additional content and displays a call screen (screen providing the use of additional functions such as a keypad, a speaker, and a mute function) provided by the OS in connection with call processing instead of the additional content displayed on the display device, so that the user can use functions related with call provided by the OS, for example, a button input, a memo, a speakerphone function and the like.

Figure 5:
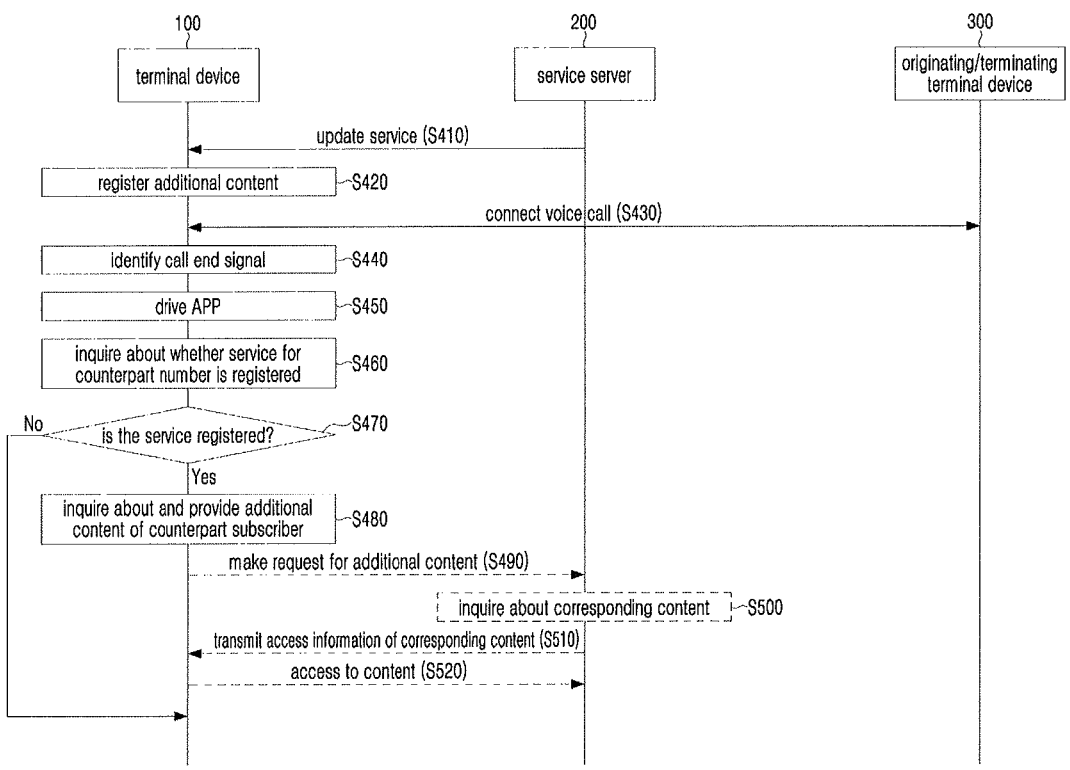
FIG. 5 is a flowchart illustrating an operation method of a call processing supplementary service providing system according to a third embodiment of the present disclosure.

Hereinafter, an operation method of the call processing supplementary service system corresponding to the voice call ending operation according to the third embodiment of the present disclosure will be described with reference to FIG. 5.

The terminal device 100 first receives additional content newly registered by the originating/terminating terminal device 300 from the service server 200 in S410.

Preferably, the terminal device 100 receives the additional content newly registered by a call connection counterpart, that is, the originating/terminating terminal device 300 from the service server 200 in a process of updating an application installed to provide the additional content.

Then, the terminal device 100 registers additional content corresponding to originator/terminator identification information in S420.

Preferably, the terminal device 100 transmits additional contents corresponding to a phone number of the originating/terminating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Then, the terminal device 100 detects the current state and generates an event signal corresponding to the detected current state in S430 to S450.

Preferably, the terminal device 100 monitors the current state through an Operating System (OS) to detect switching from a voice call connection state to a voice call end state and generates an event signal corresponding to the detected voice call end state, so as to transmit the corresponding event signal to an application installed to provide the additional content through the platform. In connection with this, the OS transmits the event signal including a counterpart number according to the detected voice call end state to the platform and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the voice call end state.

Next, when the voice call end state is detected through the event signal, the terminal device 100 provides pre-registered additional content corresponding to the voice call in S460 to S480.

Preferably, when the voice call end state is detected through the installed application, the terminal device 100 inquires about information on whether a service of the counterpart number is registered included in the event signal to identify a service registration state, inquires about a registered additional content corresponding to a corresponding subscriber, and displays the corresponding content on a display device. In connection with this, when the content corresponding to the counterpart subscriber is registered, the terminal device 100 extracts the corresponding content and provides the extracted content. When only access information of the corresponding content is registered, the terminal device 100 acquires the content based on the corresponding access information and provides the acquired content.

Meanwhile, when the terminal device 100 receives a request for additional content mapped to the additional content provided from a user, the terminal device 100 may acquire the corresponding content from the service server 200 and provide the acquired content to the user in S490 to S520.

Figure 6:
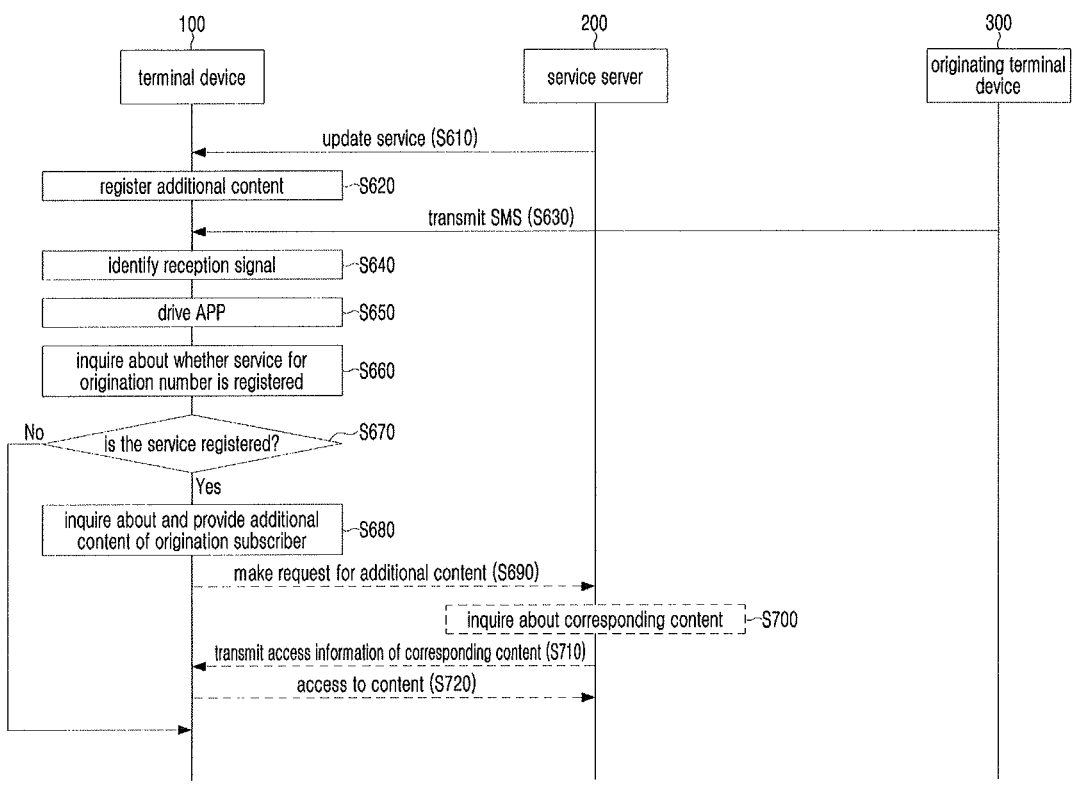
FIG. 6 is a flowchart illustrating an operation method of a call processing supplementary service providing system according to a fourth embodiment of the present disclosure.

Hereinafter, an operation method of the call processing supplementary service system corresponding to the SMS receiving operation according to the fourth embodiment of the present disclosure will be described with reference to FIG. 6.

The terminal device 100 first receives additional content newly registered by the originating terminal device 300 from the service server 200 in S610.

Preferably, the terminal device 100 receives the additional content newly registered by the originating terminal device 300 from the service server 200 in a process of updating an application installed to provide the additional content.

Then, the terminal device 100 registers additional content corresponding to originator identification information in S620.

Preferably, the terminal device 100 transmits additional contents corresponding to a phone number of the originating terminal device 300, for example, image information, an image, a text and the like to the installed application and registers the additional contents. At this time, in registering the additional content, the terminal device 100 may register the original content or register access information (for example, URL) of the additional content and thus access the corresponding content based on the access information registered when the additional content is provided.

Then, the terminal device 100 detects the current state and generates an event signal corresponding to the detected current state in S630 to S650.

Preferably, the terminal device 100 monitors the current state through an Operating System (OS) to detect the SMS reception state and generates an event signal corresponding to the detected SMS reception state, so as to transmit the corresponding event signal to an application installed to provide the additional content through the platform. In connection with this, the OS transmits the event signal including an origination number according to the detected SMS reception state to the platform and the event signal transmitted to the platform is differently transmitted according to whether the application is activated. In other words, when the application is in an active (driving) state, the application acquires by itself the event signal transmitted from the OS through continuous monitoring of the platform. In contrast, when the application is in an inactive (non-driving) state, the platform transmits the event signal transmitted from the OS to the application and switches the state of the application to the active state, so as to allow the application to recognize the SMS reception state.

Thereafter, when the SMS reception state is detected through the event signal, the terminal device 100 provides pre-registered additional content in S60 to S680.

Preferably, when the SMS reception state is detected by the installed application, the terminal device 100 inquires about information on whether a service of the origination number is registered included in the event signal to identify a service registration state, inquires about a registered additional content corresponding to a corresponding origination subscriber, and display the corresponding content on a display device. In connection with this, when the content corresponding to the origination subscriber is registered, the terminal device 100 extracts the corresponding content and provides the extracted content. When only access information of the corresponding content is registered, the terminal device 100 acquires the content based on the corresponding access information and provides the acquired content.

Meanwhile, when the terminal device 100 receives a request for additional content mapped to the additional content provided from the user, the terminal device 100 may acquire the corresponding content from the service server 200 and provide the acquired content to the user in S690 to S720.

Figure 7:
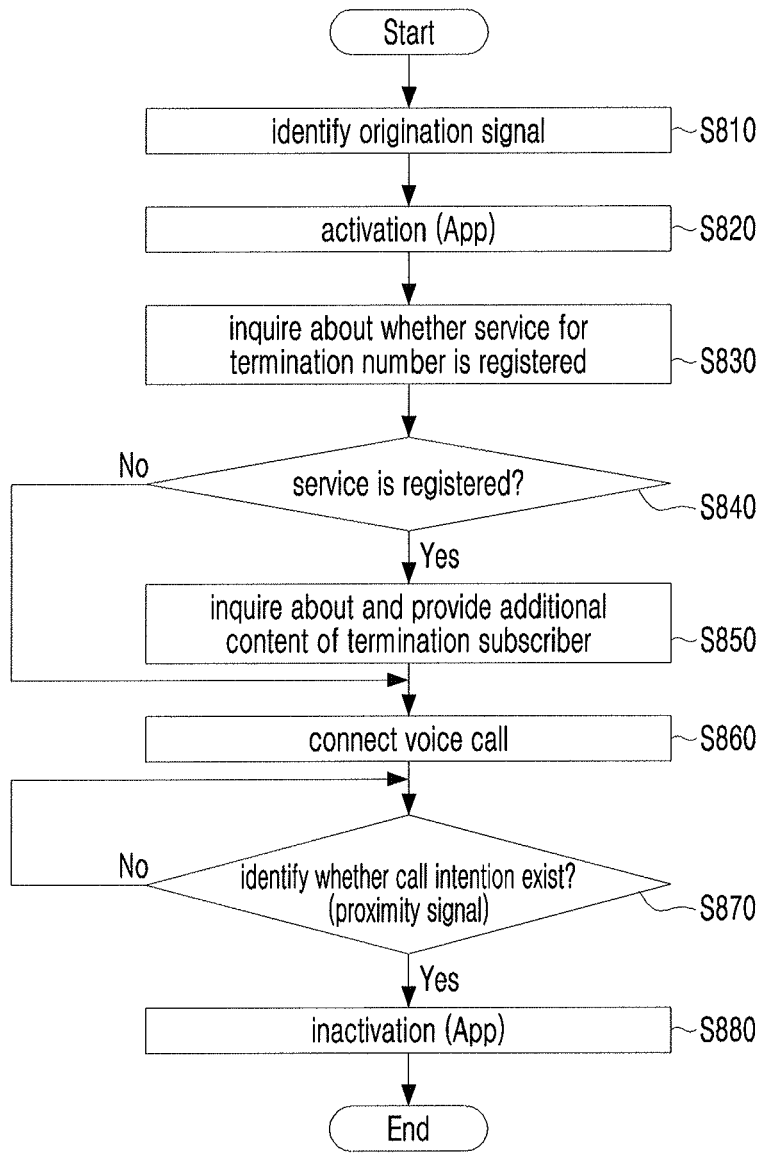
FIG. 7 is a flowchart illustrating an operation method of a terminal device according to the first embodiment of the present disclosure.

Hereinafter, an operation method of the terminal device 100 corresponding to the voice call originating operation according to the first embodiment of the present disclosure will be described with reference to the configuration of FIG. 7.

The terminal device 100 first monitors the current state to detect a voice call origination attempt state in S810 to S820.

Preferably, the terminal operator 110 monitors the current state of the terminal device 100 to detect the voice call origination attempt state and generates an event signal corresponding to the detected voice call origination attempt state, so as to transmit the corresponding event signal to the service provider 120 through the platform. In connection with this, the terminal operator 110 transmits the event signal including a termination number input by a user according to the detected voice call origination attempt state to the platform and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the OS to the service provider 120 and switches the state of the service provider 120 to the active state, so as to allow the service provider 120 to recognize the voice call origination attempt state.

Next, when the voice call origination attempt state is detected through the event signal, pre-registered additional content corresponding to the voice call is provided in S830 to S850.

Preferably, when the voice call origination attempt state is detected through the event signal, the service provider 120 inquires about information on whether a service of the termination number is registered included in the event signal to identify a service registration state, inquires about a registered additional content corresponding to a corresponding termination subscriber, and displays the corresponding content on a display device. In connection with this, when the content corresponding to the termination subscriber is registered, the service provider 120 extracts the corresponding content and provides the extracted content. When only access information of the corresponding content is registered, the service provider 100 acquires the content based on the corresponding access information and provides the acquired content.

Thereafter, when a voice call connection state is detected or an originator attempts a voice call after the voice call connection, provision of the additional content is stopped in S860 to S880.

More specifically, when the voice call connection state is detected through the event signal after the voice call origination attempt state or it is determined that the voice call attempt of the originator is made after the voice call connection, the service provider 120 stops providing additional content. In connection with this, for example, when a state where the originator holds the terminal device to his/her ear is detected through an installed proximity sensor or a voice input of the originator is detected, the terminal operator 110 generates an event signal corresponding to the detection and allows the service provider 120 to detect a voice call attempt of the originator, that is, a user's call intention. In response to the detection of the user's call intention, the service provider 120 switches an operation state to an inactive state to stop providing the additional content and displays a call screen (screen providing the use of additional functions such as a keypad, a speaker, and a mute function) provided by the terminal operator 110 itself in connection with call processing instead of the additional content displayed on the display device, so that the user can use functions related with call provided by the terminal operator 110, for example, a button input, a memo, a speakerphone function and the like.

Figure 8:
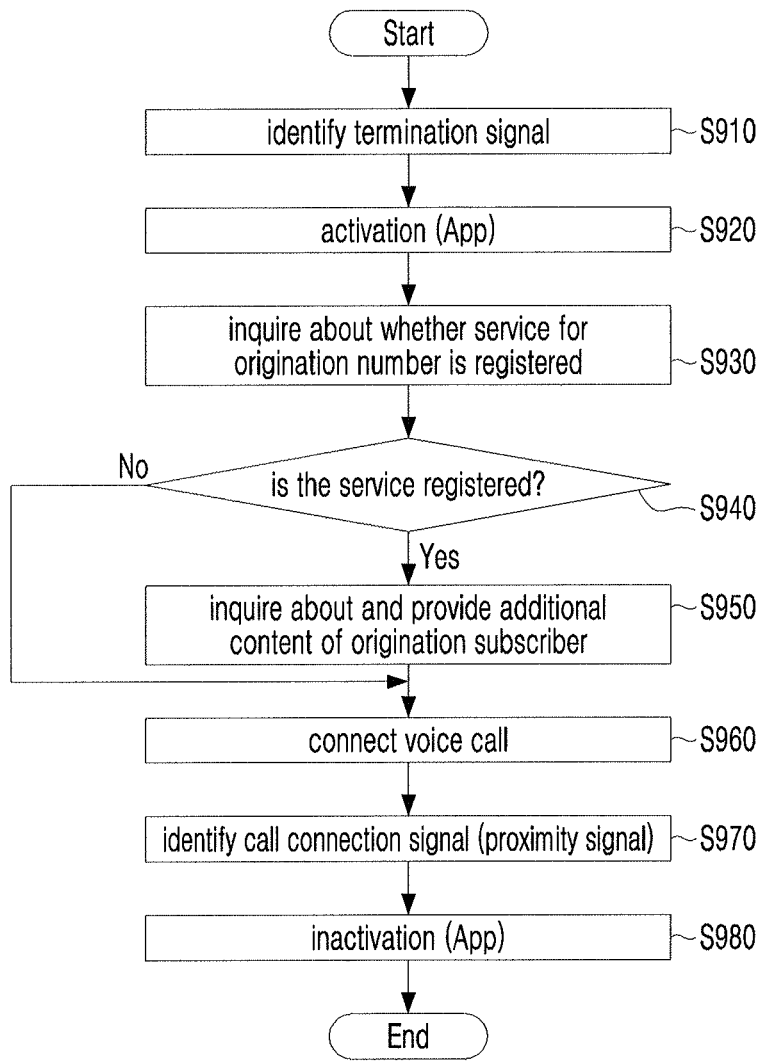
FIG. 8 is a flowchart illustrating an operation method of a terminal device according to the second embodiment of the present disclosure.

Hereinafter, an operation method of the terminal device 100 corresponding to the voice call terminating operation according to the second embodiment of the present disclosure will be described with reference to the configuration of FIG. 8.

The terminal device 100 first monitors the current state to detect a voice call termination attempt state in S910 to S920.

Preferably, the terminal operator 110 monitors the current state of the terminal device 100 to detect the voice call termination attempt state and generates an event signal corresponding to the detected voice call termination attempt state, so as to transmit the corresponding event signal to the service provider 120 through the platform. In connection with this, the terminal operator 110 transmits the event signal including an origination number input by a user according to the detected voice call termination attempt state to the platform and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the terminal operator 110 to the service provider 120 and switches the state of the service provider 120 to the active state, so as to allow the service provider 120 to recognize the voice call termination attempt state.

Next, when the voice call termination attempt state is detected through the event signal, pre-registered additional content corresponding to the voice call is provided in S930 to S950.

Preferably, when the voice call termination attempt state is detected by the installed application, the service provider 120 inquires about information whether a service of the origination number is registered included in the event signal to identify a service registration state, inquires about a registered additional content corresponding to a corresponding origination subscriber, and displays the corresponding content on a display device. In connection with this, when the content corresponding to the origination subscriber is registered, the service provider 120 extracts the corresponding content and provides the extracted content. When only access information of the corresponding content is registered, the service provider 120 acquires the content based on the corresponding access information and provides the acquired content.

Thereafter, provision of the additional content is stopped when a voice call connection state is detected in S960 to S980.

Preferably, when the voice call connection state is detected through the event signal after the voice call termination attempt state, the service provider 120 stops providing additional content. In connection with this, when a call connection button input of the user is detected in response to the voice call termination, the terminal operator generates an event signal corresponding to the corresponding state and allows the service provider 120 to detect the voice call connection state. In response to the detection of the voice call connection state, the service provider 120 switches an operation state to an inactive state to stop providing the additional content and displays a call screen (screen providing the use of additional functions such as a keypad, a speaker, and a mute function) provided by the terminal operator 110 itself in connection with call processing instead of the additional content displayed on the display device, so that the user can use functions related with call provided by the terminal operator 110, for example, a button input, a memo, a speakerphone function and the like.

Figure 9:
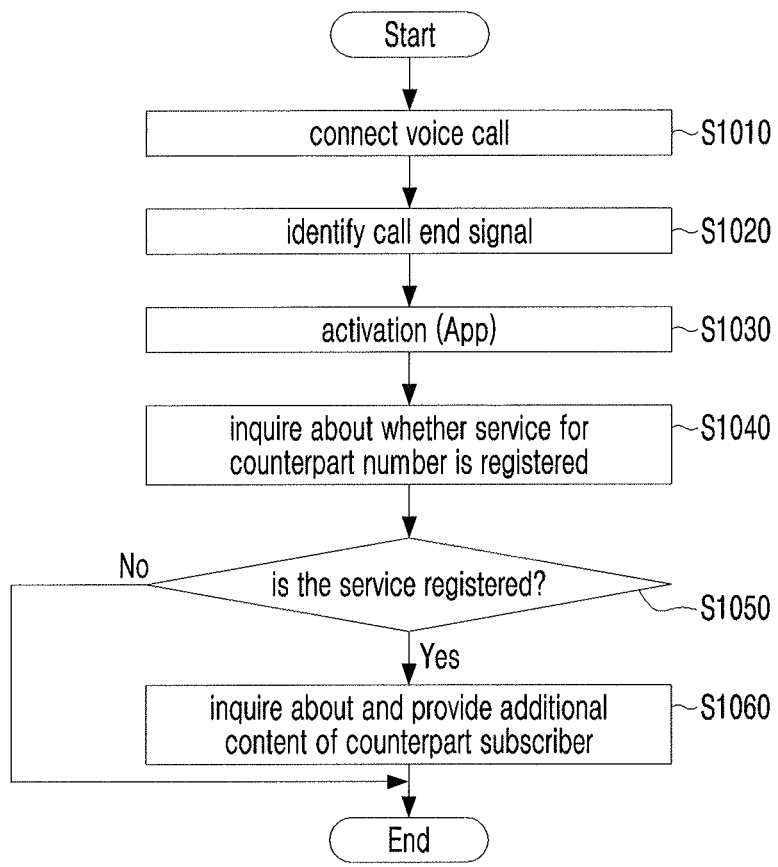
FIG. 9 is a flowchart illustrating an operation method of a terminal device according to the third embodiment of the present disclosure.

Hereinafter, an operation method of the terminal device 100 corresponding to the voice call ending operation according to the third embodiment of the present disclosure will be described with reference to the configuration of FIG. 9.

First, the current state is monitored and a voice call ending state is detected in S1010 to S1030.

Preferably, the terminal operator 110 monitors the current state of the terminal device 100 to detect switching from a voice call connection state to a voice call end state and generates an event signal corresponding to the detected voice call end state, so as to transmit the corresponding event signal to the service provider 120 through the platform. In connection with this, the terminal operator 110 transmits the event signal including a counterpart number according to the detected voice call end state to the platform and the event signal transmitted to the platform is differently transmitted according to whether the service provider 120 is activated. In other words, when the service provider 120 is in an active (driving) state, the service provider 120 acquires by itself the event signal transmitted from the OS through continuous monitoring of the platform. In contrast, when the service provider 120 is in an inactive (non-driving) state, the platform transmits the event signal transmitted from the terminal operator 120 to the service provider 120 and switches the state of the service provider 120 to the active state, so as to allow the service provider 120 to recognize the voice call end state.

Then, when the voice call end state is detected through the event signal, pre-registered additional content corresponding to the voice call is provided in S1040 to S1060.

More specifically, when the voice call end state is detected through the event signal, the service provider 120 inquires about information on whether a service of the counterpart number is registered included in the event signal to identify a service registration state, inquires about a registered additional content corresponding to a corresponding subscriber, and displays the corresponding content on a display device. In connection with this, when the content corresponding to the counterpart subscriber is registered, the service provider 120 extracts the corresponding content and provides the extracted content. When only access information of the corresponding content is registered, the service provider 100 acquires the content based on the corresponding access information and provides the acquired content.

Figure 10:
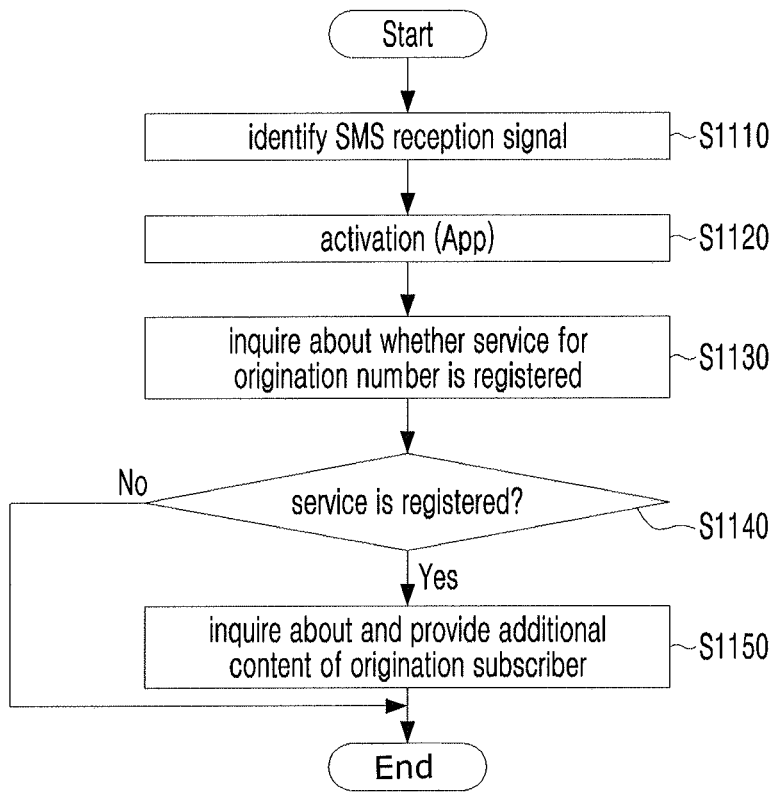
FIG. 10 is a flowchart illustrating an operation method of a terminal device according to the fourth embodiment of the present disclosure.

Hereinafter, an operation method of the terminal device 100 corresponding to the SMS receiving operation according to the fourth embodiment of the present disclosure will be described with reference to the configuration of FIG. 10.

First, the current state is detected and an SMS reception state is detected in S1110 to S1120.

Preferably, the terminal operator 110 monitors the current state of the terminal device 100 to detect an SMS reception state and generates an event signal corresponding to the detected SMS reception state, so as to transmit the corresponding event signal to the service provider 120 through the platform. In connection with this, the terminal operator 110 transmits the event signal including an origination number to the platform according to the detected SMS reception state and the event signal transmitted to the platform is differently transmitted according to whether the service provider 120 is activated. In other words, when the service provider 120 is in an active (driving) state, the service provider 120 acquires by itself the event signal transmitted from the terminal operator 110 through continuous monitoring of the platform. In contrast, when the service provider 120 is in an inactive (non-driving) state, the platform transmits the event signal transmitted from the terminal operator 110 to the service provider 120 and switches the state of the service provider 120 to the active state, so as to allow the service provider 120 to recognize the SMS reception state.

Thereafter, when the SMS reception state is detected through the event signal, pre-registered additional content is provided in S1130 to S1150.

Preferably, when the SMS reception state is detected through the event signal, the service provider 120 inquires about information on whether a service of the origination number is registered included in the event signal to identify a service registration state, inquires about a registered additional content corresponding to a corresponding origination subscriber, and displays the corresponding content on a display device. In connection with this, when the content corresponding to the origination subscriber is registered, the service provider 120 extracts the corresponding content and provides the extracted content. When only access information of the corresponding content is registered, the service provider 120 acquires the content based on the corresponding access information and provides the acquired content.

As described above, based on the call processing supplementary service system according to the present disclosure, the current state of the terminal device including the call processing state is detected through an interworking with the OS and the pre-registered additional content by the user is provided to the originator/terminator in accordance with the detected current state. As a result, a call supplementary service can be conveniently provided without intervention of a communication service provider. Further, since a service user can identify in advance an image of an origination/termination counterpart authorized through a service registration in origination/termination before a call connection, the user can trust an identity of the origination counterpart and use information provided by the origination counterpart, thereby preventing various voice phishing attacks in advance. Moreover, when a voice call connection state or a user's call intention is detected, a call screen provided by the OS itself in connection with call processing instead of the additional content displayed on the display device is displayed, and accordingly, various types of additional contents can be provided to the user who desires to use a voice call without any inconvenience. Therefore, the utilization of the service can increase. Furthermore, just after a call ends, a call center may conduct a survey for customer satisfaction through the screen of the terminal device to increase a participation rate.

Meanwhile, the method described in connection with the provided embodiments or steps of the algorithm may be implemented in a form of a program command, which can be executed through various computer means, and recorded in a computer-readable recording medium. The computer-readable medium may include a program command, a data file, and a data structure individually or a combination thereof. The program command recorded in the medium is specially designed and configured for the present disclosure, but may be used after being known to those skilled in computer software fields. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices may be configured to operate as one or more software modules to perform the operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

INDUSTRIAL APPLICABILITY

According to a call processing supplementary service providing terminal device and an operation method thereof according to the present disclosure, the present disclosure overcomes the limitations of the conventional technologies in that the current state of a terminal including a call processing state can be detected through an interworking with an Operating System (OS) and pre-registered additional content by a user can be provided to an originator/terminator in accordance with the detected current state. Accordingly, related technologies of the present disclosure can be used and also the device to which the present disclosure is applied has a high probability of entering into the market and being sold. Therefore, the present disclosure can be obviously implemented in reality and thus is highly applicable to the industries.

What is claimed is:

1. A terminal device comprising:
a terminal operator configured to detect a current state of the terminal device and provide an event signal corresponding to the detected current state; and
a service provider configured to, when at least one of a voice call origination attempt state and a voice call end state is detected through the event signal, provide a pre-registered additional content corresponding to a voice call, and
wherein the service provider stops providing the additional content by switching an active state to an inactive state, when a voice call connection state is detected through the event signal after the voice call origination attempt state or an attempt of the voice call by an originator is detected after a voice call connection,
the terminal operator transmits the event signal to platform,
the service provider receives the event signal from the platform, and
when the service provider is in active state, the service provider acquires the event signal from the platform through continuous monitoring of the platform, and
when the service provider is in inactive state, the service provider is switched to the active state and acquires the event signal, if the platform transmits the event signal corresponding to at least one state of the voice call origination attempt state and a voice call end state to the service provider.

2. The terminal device of claim 1, wherein, when at least one of the voice call origination attempt state and the voice call end state is detected through the event signal, the service provider provides the pre-registered additional content corresponding to originator identification information or terminator identification information of the voice call.

3. The terminal device of claim 1, wherein, when at least one of the voice call origination attempt state and the voice call end state is detected through the event signal, the service provider provides the pre-registered additional content corresponding to originator identification information or terminator identification information of the voice call by switching operation state to an active state.

4. A terminal device comprising:
a terminal operator configured to detect a current state of the terminal device and provides an event signal corresponding to the detected current state; and
a service provider configured to, when at least one of a voice call termination attempt state and a voice call end state is detected through the event signal, provide a pre-registered additional content corresponding to a voice call, and
wherein the service provider stops providing the additional content by switching an active state to an inactive state, when a voice call connection state is detected through the event signal after the voice call termination attempt state,
the terminal operator transmits the event signal to platform,
the service provider receives the event signal from the platform, and
when the service provider is in active state, the service provider acquires the event signal from the platform through continuous monitoring of the platform, and
when the service provider is in inactive state, the service provider is switched to the active state and acquires the event signal, if the platform transmits the event signal corresponding to at least one state of the voice call origination attempt state and a voice call end state to the service provider.

5. The terminal device of claim 4, wherein, when at least one of the voice call termination attempt state and the voice call end state is detected through the event signal, the service provider provides the pre-registered additional content corresponding to originator identification information and terminator identification information of the voice call.

6. The terminal device of claim 4, wherein, when a Short Message Service (SMS) reception state is detected through the event signal, the service provider provides the pre-registered additional content corresponding to originator identification information and terminator identification information of a SMS.

7. The terminal device of claim 4, wherein, when an event signal corresponding to at least one of the voice call termination attempt state and the voice call end state is received, the service provider provides the pre-registered additional content corresponding to originator identification information and terminator identification information of the voice call by switching an operation state to an active state.

8. An operation method of a terminal device, the operation method comprising:
detecting a current state of the terminal device and generating an event signal corresponding to the detected current state by a terminal operator;
identifying the current state of the terminal device corresponding to the event signal by a service provider; and
providing pre-registered additional content corresponding to a voice call by the service provider, when at least one of a voice call origination attempt state and a voice call end state is detected through the event signal, and
the operation method further comprising stopping providing the additional content by switching an active state to an inactive state by the service provider, when a voice call connection state is detected through the event signal after the voice call origination attempt state or an attempt of a voice call by an originator is detected after a voice call connection, and
wherein at the generating the event signal, the terminal operator transmits the event signal to platform, and
at the detecting the current state, the service provider receives the event signal from the platform, when the service provider is in active state, the service provider acquires the event signal from the platform through continuous monitoring of the platform, and when the service provider is in inactive state, the service provider is switched to the active state, acquires the event signal and detects the current state of the terminal device, if the platform transmits the event signal corresponding to at least one state of the voice call origination attempt state and a voice call end state to the service provider.

9. The operation method of claim 8, wherein the providing of the pre-registered additional content comprises, when at least one of the voice call origination attempt state and the voice call end state is detected, providing the pre-registered additional content corresponding to originator identification information or terminator identification information of the voice call.

10. The operation method of claim 8, wherein the providing of the pre-registered additional content comprises, when an event signal corresponding to at least one of the voice call origination attempt state and the voice call end state is generated, providing the pre-registered additional content corresponding to originator identification information or terminator identification information of the voice call by switching an operation state to an active state.

11. An operation method of a terminal device, the operation method comprising:
detecting a current state of the terminal device and generating an event signal corresponding to the detected current state by a terminal operator;
identifying the current state of the terminal device corresponding to the event signal by a service provider; and
providing a pre-registered additional content corresponding to a voice call by the service provider, when at least one of a voice call termination attempt state and a voice call end state is detected through the event signal,
the operation method further comprising stopping providing the additional content by switching an active state to an inactive state by the service provider, when a voice call connection state is detected through the event signal after the voice call termination attempt state,
wherein at the generating the event signal, the terminal operator transmits the event signal to platform, and
at the detecting the current state, the service provider receives the event signal from the platform, when the service provider is in active state, the service provider acquires the event signal from the platform through continuous monitoring of the platform, and when the service provider is in inactive state, the service provider is switched to the active state, acquires the event signal and detects the current state of the terminal device, if the platform transmits the event signal corresponding to at least one state of the voice call origination attempt state and a voice call end state to the service provider.

12. The operation method of claim 11, wherein the providing of the pre-registered additional content comprises, when at least one of the voice call termination attempt state and the voice call end state is detected through the event signal, providing the pre-registered additional content corresponding to originator identification information and terminator identification information of the voice call.

13. The operation method of claim 11, wherein the providing of the pre-registered additional content comprises, when a Short Message Service (SMS) reception state is detected through the event signal, providing the pre-registered additional content corresponding to originator identification information and terminator identification information of an SMS.

14. The operation method of claim 11, wherein the providing of the pre-registered additional content comprises, when an event signal corresponding to at least one of the voice call termination attempt state and the voice call end state is generated, providing the pre-registered additional content corresponding to originator identification information and terminator identification information of the voice call by switching an operation state to an active state.

15. A non-transitory computer-readable recording medium comprising commands configured to execute:
   detecting an event signal generated in accordance with a current state of a terminal device by a terminal operator;
   identifying at least one of a voice call origination attempt state and a voice call end state through the event signal by a service provider;
   providing a pre-registered additional content corresponding to originator identification information or terminator identification information of a voice call by the service provider, according to the identification of at least one of the voice call origination attempt state and the voice call end state; and
   stopping providing an additional content by switching an active state to an inactive state by the service provider, when a voice call connection state is detected through the event signal after the voice call origination attempt state or an attempt of the voice call by an originator is detected after a voice call connection,
   wherein at the generating the event signal, the terminal operator transmits the event signal to platform, and
   at the detecting the current state, the service provider receives the event signal from the platform, when the service provider is in active state, the service provider acquires the event signal from the platform through continuous monitoring of the platform, and when the service provider is in inactive state, the service provider is switched to the active state, acquires the event signal and detects the current state of the terminal device, if the platform transmits the event signal corresponding to at least one state of the voice call origination attempt state and a voice call end state to the service provider.

16. A non-transitory computer-readable recording medium comprising commands configured to execute:
   detecting an event signal generated in accordance with a current state of a terminal device by a terminal operator;
   identifying at least one of a voice call termination attempt state and a voice call end state through the event signal by a service provider;
   providing a pre-registered additional content corresponding to originator identification information or terminator identification information of a voice call by the service provider, according to the identification of at least one of the voice call termination attempt state and the voice call end state; and
   stopping providing the additional content by the service provider, when a voice call connection state is detected through the event signal after the voice call termination attempt state, and
   wherein at the generating the event signal, the terminal operator transmits the event signal to platform, and
   at the detecting the current state, the service provider receives the event signal from the platform, when the service provider is in active state, the service provider acquires the event signal from the platform through continuous monitoring of the platform, and when the service provider is in inactive state, the service provider is switched to the active state, acquires the event signal and detects the current state of the terminal device, if the platform transmits the event signal corresponding to at least one state of the voice call origination attempt state and a voice call end state to the service provide.

* * * * *